(12) United States Patent
Muthiah et al.

(10) Patent No.: US 9,877,443 B2
(45) Date of Patent: Jan. 30, 2018

(54) WATERING SYSTEMS

(71) Applicants: Jeno Muthiah, Wayne, IL (US); Gerald K. White, Amelia Island, FL (US); Duane R. Rubash, North Ft. Myers, FL (US)

(72) Inventors: Jeno Muthiah, Wayne, IL (US); Gerald K. White, Amelia Island, FL (US); Duane R. Rubash, North Ft. Myers, FL (US)

(73) Assignee: SYNERGISTIC VENTURES, INC., Homerglen, IL (US)

( * ) Notice: Subject to any disclaimer, the term of this patent is extended or adjusted under 35 U.S.C. 154(b) by 61 days.

(21) Appl. No.: 15/173,838

(22) Filed: Jun. 6, 2016

(65) Prior Publication Data
US 2016/0278312 A1     Sep. 29, 2016

Related U.S. Application Data

(63) Continuation of application No. 14/194,740, filed on Mar. 2, 2014, now Pat. No. 9,578,820, and a
(Continued)

(51) Int. Cl.
*A01G 27/04* (2006.01)
*A01G 27/06* (2006.01)
(Continued)

(52) U.S. Cl.
CPC ............. *A01G 27/06* (2013.01); *A01G 1/001* (2013.01); *A01G 27/003* (2013.01); *A01G 27/04* (2013.01);
(Continued)

(58) Field of Classification Search
CPC ......... A01G 27/02; A01G 27/04; A01G 27/06
See application file for complete search history.

(56) References Cited

U.S. PATENT DOCUMENTS 2,084,005 A * 6/1937 Richards ................ A01G 27/06
239/44
2,346,029 A * 4/1944 Jennings ................ A01G 27/04
239/44
(Continued)

*Primary Examiner* — Monica Williams
(74) *Attorney, Agent, or Firm* — Gerald K. White

(57) ABSTRACT

A method of underground watering utilizes a pouch-like container product made by joining a first sheet having SAP particles adhered to a first surface with a second sheet to form a container partially filled with such particles. The application of pressure, for example by passing the product through a roll nip, facilitates joining of the sheets and causes the particles to break through at least the one of the sheets to create an opening whereby free volume is created to permit the particles to expand when in contact with a liquid. The resultant product is used to collect, store, and dispense water-containing liquids into the soil for watering of agricultural plants, trees, and the like. A composite underground watering element is also included in an embodiment of the invention. The inventive products may also be used as a pad, including a propagation pad, to collect, store, and dispense water-containing-liquids into plant vessels to provide watering of plants. Also included are underground watering of athletic fields and golf course greens, erosion control products and plant root balls having a watering collar.

1 Claim, 6 Drawing Sheets

Related U.S. Application Data continuation-in-part of application No. 11/605,167, filed on Nov. 28, 2006, now Pat. No. 9,078,785.

(51) Int. Cl.
| | |
|---|---|
| *A01G 1/00* | (2006.01) |
| *A01G 27/00* | (2006.01) |
| *A01G 29/00* | (2006.01) |
| *B01J 20/22* | (2006.01) |
| *B01J 20/28* | (2006.01) |
| *E02B 13/00* | (2006.01) |
| *E02D 3/00* | (2006.01) |

(52) U.S. Cl.
CPC .............. *A01G 29/00* (2013.01); *B01J 20/22* (2013.01); *B01J 20/28016* (2013.01); *E02B 13/00* (2013.01); *E02D 3/005* (2013.01)

(56) References Cited

U.S. PATENT DOCUMENTS

| | | | | |
|---|---|---|---|---|
| 3,192,665 A | * | 7/1965 | Cloud | A01G 27/06 47/80 |
| 3,298,133 A | * | 1/1967 | Courtright | A01G 9/102 47/61 |
| 4,343,109 A | * | 8/1982 | Holtkamp | A01G 27/04 47/39 |
| 5,611,885 A | * | 3/1997 | Hansen | A61L 15/60 156/326 |
| 5,792,513 A | * | 8/1998 | Koslow | A61F 13/15658 427/195 |
| 5,829,193 A | * | 11/1998 | Otake | A01G 9/024 47/65.8 |
| 6,485,813 B1 | * | 11/2002 | Koslow | A61F 13/15658 428/198 |
| 6,534,572 B1 | * | 3/2003 | Ahmed | A61L 15/225 428/467 |
| 8,261,913 B2 | * | 9/2012 | Keats | A01G 9/023 206/423 |
| 2003/0175418 A1 | * | 9/2003 | Muthiah | A61F 13/53 427/180 |
| 2004/0020114 A1 | * | 2/2004 | Boehmer | A01C 1/044 47/57.6 |
| 2004/0087923 A1 | * | 5/2004 | Cole | A61F 13/531 604/365 |
| 2004/0142113 A1 | * | 7/2004 | Anderson | C05G 3/04 427/384 |
| 2004/0237402 A1 | * | 12/2004 | Nielsen | A01G 27/04 47/80 |
| 2007/0283621 A1 | * | 12/2007 | Holloway | A01C 1/044 47/56 |
| 2008/0110089 A1 | * | 5/2008 | Spray | A01G 27/04 47/79 |
| 2015/0173305 A1 | * | 6/2015 | Kidder | A01G 27/04 47/79 |

* cited by examiner

WATERING SYSTEMS

This application is a continuation of U.S. patent application Ser. No. 14/194,740, filed Mar. 2, 2014, entitled Watering Systems, which in turn, is a continuation-in-part of U.S. patent application Ser. No. 11/605,167, filed Nov. 28, 2006, which is now U.S. Pat. No. 9,078,785 entitled Improved Absorbent Product and Method of Making.

The present invention relates to liquid absorbent products and methods for making such products. The invention may be used as a core element for absorbent products, such as diapers, training pants, feminine care products, and the like or as a water collection, storage, and dispensing element for applications such as irrigation, erosion control, or plant watering and plant root growth control.

BACKGROUND OF THE INVENTION

Disposable absorbent products currently find widespread use in many applications. For example, in the infant and childcare areas, diapers and training pants have generally replaced reusable cloth absorbent articles. Other typical disposable absorbent products include feminine care products such as sanitary napkins, panty shields, or tampons; adult incontinence products; and health care products such as surgical drapes or wound dressings. A typical disposable absorbent product generally comprises a composite structure including a top sheet, a back sheet, and an absorbent core structure between the top sheet and back sheet. These products usually include some type of fastening system for fitting the product onto the wearer.

The use of water-swellable, generally water-insoluble absorbent materials, commonly known as superabsorbent polymers ("SAP"), in disposable absorbent personal care products is known. Such absorbent materials are generally employed in absorbent products in order to increase the absorbent capacity of such products while reducing their overall bulk. Such absorbent materials are generally present in absorbent products in the form of small particles and may be included in a fibrous matrix, such as a matrix of wood pulp fluff. A matrix of wood pulp fluff generally has an absorbent capacity of about 6 grams of liquid per gram of fluff. The superabsorbent materials generally have an absorbent capacity of at least about 10, preferably of about 20, and often of up to 100 times, and even up to 300 times, their weight in water. Clearly, incorporation of such superabsorbent materials in disposable absorbent products can reduce the overall bulk while increasing the absorbent rate and capacity of such products.

The absorbent products mentioned above, such as baby diapers, adult incontinence devices, and feminine hygiene products, may be made with a cellulose fiber fluff-based absorbent core sandwiched between a liquid pervious top sheet, which allows the unobstructed passage of fluid to the absorbent core, and a liquid impervious backing sheet usually of plastic material, which contains the absorbed fluid and prevents it from passing through the absorbent core and soiling the undergarments or clothing of the wearer of the absorbent article. The core product of the present invention does not require, but may contain, fibrous material. In various embodiments of the present invention, SAP powder is held within a container, with or without fibrous material. The container may optionally include openings on either of its surfaces that are pre-formed and/or formed during manufacture so as to admit liquids to become absorbed by the SAP powder or even to become collected in liquid form. As will be disclosed in more detail later, the openings created during manufacture of the absorbent product by the SAP particles during the pressing step are sufficient for most applications.

In recent years, market demand for thinner and more comfortable absorbent articles has increased. Ultra-thin feminine napkins are no longer constructed from loose wood pulp, which tends to give a bulky product, but with a roll wood-based air-laid absorbent cores in which a roll or coil of pre-formed absorbent core material is unwound directly onto the absorbent pad-making machine without the defiberization step required for fluff-based products. The roll wood-based approach results in a product thinness, which cannot be achieved by loose fluff-based technology. As will be seen later, the present invention can produce thinner absorbent products that have comparable or improved absorbency properties to thicker products. The present invention thus serves to further reduce product thickness and weight.

Although a given SAP particle has the capability to absorb and contain a liquid, in actual practice it is difficult to efficiently utilize this capability. If the SAP particles are located as a mass in close proximity to each other, the rate of absorption and the capacity to retain absorbed liquid are reduced because the liquid will not be able to reach, or only slowly reach, the interior of the SAP mass. As the outer surface area of the SAP mass begins to absorb liquid, in effect, a barrier is created that substantially slows the rate of liquid absorption. Consequently, it is understood that the separation, as well as the size, of the SAP particles are important considerations. Attempts to address this problem have included adhering the SAP particles to non-SAP material by hot melt adhesion or the use of resinous binders, including both thermoplastic and thermosetting types. There are problems associated with these attempts. The use of such adhering materials causes encapsulation or partial encapsulation of the SAP particles and thereby prevents or reduces the surface area available for efficient liquid absorption. In addition, free volume for particle expansion is compromised. Furthermore, even when the SAP particles are initially adhered, as the particles expand and soften during the absorption phase, the particles tend to separate and migrate toward other SAP particles thereby further reducing liquid absorption and free volume. The above prior art problems are beneficially addressed by the free volume considerations underlying the present invention.

In any event, many products for absorbing liquids and processes for making thereof are described in the art. Typical of such products and processes are those described in Assignee's co-pending U.S. patent application Ser. No. 10/357,907, filed Feb. 4, 2003, and published on Sep. 18, 2003, under Publication No. US-2003-0175418-A1; U.S. Pat. No. 5,792,513; U.S. Pat. No. 6,485,813; U.S. Pat. No. 5,611,885; and U.S. Pat. No. 6,534,572. However, none of these patents or patent publications is believed to possess or teach the unique combination of advantages of the present invention.

In general, the absorbent product of the present invention may utilize SAP particles having a predominant amount of particles on the order of a maximum average particle size of about 500 microns and a minimum average particle size of about 100 microns and thereby more rapidly absorb liquids, such as water, body fluids, urine, blood, etc., than possible when using coarser particles of the same weight. However, it should be understood that lower sized particles may be mixed with larger sized particles to further increase the rate of liquid absorption. Such increased rapidity of absorption is due to the larger total surface area of the fine particles. Rapid absorption is particularly important when the absorbent product is a portion, such as a core, of a diaper product or the like. The present invention also involves spacing absorbent SAP particles apart from each other and provides the necessary free volume surrounding the particles to permit the particles to expand more readily during absorption of a liquid to improve absorption capacity, rate, and efficiency and thereby permitting the use of less SAP particles than if such SAP particles were not extended through the sheet surface(s) and not so spaced apart and did thus not have as much free volume into which to expand. Creating and maintaining free volume also has the advantage of providing a space to collect and store liquids, such as water, for subsequent dispensing to, for example, plant root systems. Other processes involving adhering SAP particles to substrates have the distinct disadvantage of covering, or even encapsulating, a surface portion of the SAP particles, thereby reducing the effectiveness of the SAP particles.

While the present invention is primarily described in connection with diaper products, it will be understood by those skilled in the art that the product of the invention may be used in water collection, storage, and dispensing applications including irrigation, erosion control, and for plant watering and plant root growth control

SUMMARY OF THE INVENTION

The present invention pertains to a method of making an absorbent product and the resultant product of such method. The method generally comprises providing a first sheet, preferably having an adhesive coated on a first side surface, and a second side surface that is opposed to the first side surface. Particles of SAP are then applied to the first surface. The SAP particles are substantially spaced apart from each other so as to create free volume for sideways expansion. A surface of a second sheet is then placed against the coated surface of the first sheet to join the sheets and to form a product that is partially filled with the particles. Pressure is applied to the thus arrayed first and second sheets to cause the particles to break through the surface of one or both of the sheets thereby forming an opening and creating free volume for the particles to expand into when in contact with a liquid.

One product of the invention generally comprises a first sheet having a first side preferably coated with an adhesive and having particles of SAP adhered to the first surface. A second sheet is joined to the surface of the first sheet to form a container being partially filled with the particles. The particles are substantially spaced apart from each other and extend through openings created in one or both of the sheet surfaces thereby creating free volume for the particles to expand into when in contact with a liquid. The particles may also extend through the other sheet to further enhance absorbency of the liquid.

A second product of the invention generally comprises a first sheet having a first side preferably coated with an adhesive and having non-SAP particles adhered to the first surface. A second sheet is joined to the surface of the first sheet to form a container being partially filled with SAP material such as particles or a film, chips, or films. The non-SAP particles are substantially spaced apart from each other and extend through openings created in one or both of the sheet surfaces thereby creating free volume to permit the SAP material to expand when in contact with a liquid. This product is especially adapted for long term use applications such as in irrigation, erosion control, plant root ball watering, and plant root direction control.

A third product of the invention comprises first and second sheets joined together to form a container being partially filled with SAP material such as particles, chips, or films. One or both sheets have openings to permit the entry and exit of a liquid, such as water. This product is especially adapted for applications such as those described in the preceding paragraph.

The present invention also includes a method of underground watering wherein a liquid containing water is collected, stored, and dispensed into soil at an underground location. Such method comprises placing a container underground in the soil. Such container is partially filled with particles of SAP. Partial filling creates free volume in the container for the SAP particles to expand into when in contact with a liquid. The liquid comprises water and may contain other ingredients such as nutrients for plant nutrition. The container comprising a first film joined with a second film. The first film has an adhesive coated first side surface located on an inside surface of the container and an opposed second side surface located on an outside surface of the container. The second film has a first side surface located on an inside surface of the container and an opposed second side surface located on an outside surface of the container. The first film is sufficiently brittle for the particles of SAP to penetrate and break through the first film. The SAP particles of superabsorbent polymeric powder are of sufficiently large size to penetrate and break through the first and second side surfaces of the first film. The SAP particles are adhered to and extend through the first and second side surfaces of the first film through an opening created by such penetration and breaking through the first film by the SAP particles thereby creating further free volume for these particles to expand into when in contact with a liquid. The broken through particles are spaced apart from each other to minimize touching of the broken through particles thereby enhancing liquid absorption rate and creating further free volume for the broken through particles to expand into when in contact with a liquid. The SAP particles in the container are then contacted with a liquid to cause the particles to collect and store said liquid. Then later the collected and stored liquid is dispensed into the soil as the soil dries.

The above method may also be practiced where a liquid, such as water, is placed in the container by 1) permitting water to enter the container through contact with the SAP particles; or 2) introducing water into the container interior from an outside source through an opening. With either of these two embodiments, the SAP particles in the container serve to collect, store, and dispense water into the soil as the soil dries.

A further method of underground watering comprises a method of collecting, storing, and dispensing water into soil at an underground location. Such method comprises placing a watering unit container underground in the soil. The container is formed by joining a first and second film and is partially filled with particles of SAP. The container may positioned, such as by cladding, upon an exterior surface of a hollow element having openings extending from an interior surface to an exterior surface of the element or the container may be inserted and positioned or located within the interior of the element. The container may be attached to the interior of the hollow element if desired to ensure positioning is maintained and the SAP particles have access to the sol through the openings in the hollow element. Interior positioning has the advantage of being able to be withdrawn and replaced if need be. The element is sealed at one end and connected to a source of liquid, such as water, at the other end. A different watering unit container may be used as discussed later in the specification. The SAP particles in the container are free to expand in the container when in contact with the liquid due to free volume created by partially filling the container. As noted above, the container comprises a first film joined with a second film. The films may be made from plastic. The first film has an adhesive coated first side surface located on an inside surface of the container and an opposed second side surface located on an outside surface of the container. The second film has a first side surface located on an inside surface of the container and an opposed second side surface located on an outside surface of the container. Both the first and second films are sufficiently brittle for said particles of SAP to penetrate and break through the first and second films. The SAP particles are of a sufficiently large size to penetrate and break through the first and second side surfaces of the first and second films and to extend through the first and second side surfaces of said first and second films through openings created by penetration and breaking through the first and second films by such particles, thereby creating further free volume for said particles to expand into, thereby enhancing the liquid absorption rate and creating further free volume for said broken through particles to expand into when in contact with the liquid. The broken-through particles are spaced apart from each other to minimize touching of such broken-through particles. A liquid, such as water or water containing plant nutrients or other ingredients, is passed from the liquid source into the interior of the hollow element to cause such liquid to enter the interior and pass through openings in the sides of the element and then contact the SAP particles in the container to collect and store such introduced liquid Then the collected and stored liquid is dispensed into the soil as the soil dries. Additional liquid may be required periodically to compensate for water loss during drying of the soil.

The invention also includes an underground composite watering element product for collecting, storing, and dispensing liquids containing water into soil. The composite product comprises at least two containers that are a first film joined with a second film, the first film has an adhesive coated first side surface located on an inside surface of each container and an opposed second side surface located on an outside surface of each container and a second film having a first side surface located on an inside surface of each container and an opposed second side surface located on an outside surface of each container, the first film is sufficiently brittle for particles of superabsorbent polymeric powder to penetrate and break through the first film. The first film has SAP particles of sufficiently large size to penetrate and break through the first and second side surfaces of the first film. The particles are adhered to and extend through the first and second side surfaces of the first film through an opening created by penetration and breaking through the first film by the particles thereby creating further free volume for the particles to expand into when in contact with the water-containing liquid. The broken through particles are spaced apart from each other to minimize touching of such particles thereby enhancing water absorption rate and creating further free volume for these broken through particles to expand into when in contact with said liquid containing water. The SAP particles having broken through the first film penetrate the thus created porous covering and extend into the soil. The containers have a water absorbent member interposed between the containers to form a composite product. The underground watering element is connected to a source of water-containing liquid.

A method of watering a plant located in soil may utilize the above-mentioned composite watering element product. This method embodiment comprises placing such composite product in soil at a location below a plant and then providing a water-containing liquid to the watering element for collecting, storing, and dispensing the water-containing liquid to the soil to provide water to the plant. This method may be advantageously employed for watering athletic fields and golf course greens.

The products of the invention may be utilized to control erosion of soil from slopes and the like. The product comprising two joined together sheets or films forming a container having SAP particles extending through at least one of the sheets or films may be placed below the soil and used to collect and store water that otherwise would cause soil erosion through the SAP Particles. Once the water problem has abated, the collected and stored water will then be slowly released back into the soil through the SAP particles. Collection capability may be enhanced by obtaining further water storage capability by including a water absorbent material between the sheets or films. A preferred material comprises starch containing SAP particles which typically have very large storage capability. Also contemplated as a water absorbent material is Terra-Sorb®, a potassium acrylamide copolymer. Terra-Sorb products are available from Lebanon Turf, Lebanon, Pa. Felt, non-woven fabrics, compressed fibers, or the like may also be used as a water absorbent material.

A further method of erosion control comprises placing underground the above described underground composite watering element and using such erosion control element to collect and store water thereby preventing the collected water from eroding the soil. A further advantage associated with this method is that plants located in potential erosion areas will be watered by the watering element, grow, and thus serve to further prevent erosion.

Another method of erosion control involves placing an erosion control blanket on ground where erosion is desired to be reduced. The blanket comprises a watering element and a seeding mat disposed above such element. This method comprises placing the blanket on the ground whereby watering element of the blanket collects, stores, and dispenses water to the seeding mat to assist the seeds to mature into a plant, such as grass or shrubs, and then to assist further health of the plants. The growth and subsequent health of the plant serves to reduce undesirable erosion of the ground.

Another product useful in practicing the present invention is a vessel for holding a plant comprising a container capable of holding a plant, said container having a pad located at a bottom portion of said container and connected to a source of a water-containing liquid, said pad comprising a first film joined with a second film, the first film having an adhesive coated first side surface located on an inside surface of the container and an opposed second side surface located on an outside surface of the container and the second film having a first side surface located on an inside surface of the container and an opposed second side surface located on an outside surface of the container, the first and second films being sufficiently brittle for SAP particles to penetrate and break through the first and second films, the SAP particles of sufficiently large size to penetrate and break through the first and second side surfaces of the first and second films, the particles extending through said first and second side surfaces of said first and second films through openings created by penetration and breaking through the first and second films by the particles thereby creating further free volume for the particles to expand into thereby enhancing liquid absorption rate and creating further free volume for the broken through particles to expand into when in contact with the liquid, the broken-through particles spaced apart from each other to minimize touching of the other broken through particles. A liquid containing water is introduced from below the pad to cause the water to become absorbed and collected by the broken-through particles which extend into the soil and then dispense the stored water from the container to cause watering of plant roots contained in the soil.

The above vessel may also have the broken through SAP particles extend only in a given direction into the soil. This embodiment requires that water be introduced into an interior portion of the pad because the side opposite to the broken through SAP particle has no such openings.

Another product comprises a plant root ball, such as a tree root ball. The plant has roots and is contained in a soil ball. The root ball is wrapped in a porous covering and has a watering collar secured thereto at a desired location. The watering collar comprises a first film joined with a second film. The first film has an adhesive coated first side surface located on an inside surface of the water collar container and an opposed second side surface located on an outside surface of the container. The second film has a first side surface located on an inside surface of the container and an opposed second side surface located on an outside surface of the container. The first film is sufficiently brittle for the SAP particles to penetrate and break through the first film which has SAP particles of sufficiently large size to penetrate and break through the first and second side surfaces of the first film. These particles are adhered to and extend through the first and second side surfaces of the first film through openings created by penetration and breaking through the first film by the particles thereby creating further free volume for the particles to expand into when in contact with water. The broken-through particles are spaced apart from each other to minimize touching of the other broken through particles thereby enhancing water absorption rate and creating further free volume for the broken through particles to expand into when in contact with water. The SAP particles, having broken through the first film, then penetrate into the porous covering and extend into the soil. The watering collar has an opening for connection to a source of liquid whereby the water may be introduced into an open area in the water collar, collected and stored by the SAP particles, and dispensed into the soil of the plant root ball. Two embodiments of watering collars are described in more detail in a later portion of the specification.

Another embodiment of the present invention concerns a method of watering a plant root ball once the root ball has been transplanted into the soil. Such method comprises placing a watering element containing SAP into an underground opening suitable for holding a plant root ball, and then placing the root ball into the opening, and then providing a liquid containing water into the watering element where the provided liquid passes into the soil whereby the roots of the plant are watered.

DETAILED DESCRIPTION OF THE INVENTION

Figure 1:
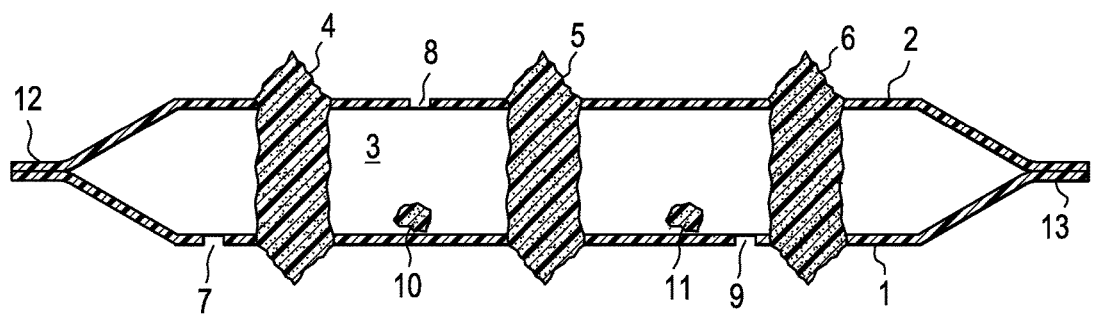
FIG. 1 is an illustration of a vertical cross section taken along a longitudinal axis of a product of the invention.

The products of the present invention are suited for use as cores in disposable products including disposable absorbent products such as diapers, diaper liners, training pants, wraps and covers, adult incontinence products, and bed pads; incontinence devices; feminine hygiene products such as sanitary napkins, panty shields, or tampons; other absorbent products such as wipes, bibs, wound dressings and surgical capes or drapes, mattress covers and puddle pads. Accordingly, in another aspect, the present invention relates to a disposable absorbent product utilizing the absorbent core of the present invention as a component. For example, such product could be used alone or in combination with other absorbent materials in previously-described absorbent products such as diapers, feminine hygiene products, adult incontinence products, wiping sheets, surgical drapes, etc. An important aspect of using this product for absorbent product applications is that the size and weight of the absorbent product would be reduced, thereby conferring benefits of comfort and appearance to the user and also creating less solid waste per unit. This latter advantage is an important factor for waste disposal sites. Some absorbent products contain an acquisition layer to absorb and then more slowly disperse urine or other liquid into a superabsorbent polymeric powder-containing portion of the absorbent product. In accordance with this invention, the use of fine superabsorbent polymeric powder with its attendant rapid absorption rates may reduce the size of, or eliminate the need for, such acquisition layer.

The products of the present invention are also suited to be used as secured elements or containers having sufficient free volume to enhance the collection, storing, and dispensing of water for irrigation applications. Simply placing SAP particles in the ground does not address or provide the requisite free volume and thus the potential absorption properties of such SAP particles are not efficiently realized. The elements are placed underground and preferably secured at a desired location(s). Placement may be accomplished by digging a hole in the ground, placing and securing the element in such hole, and covering the element. Alternatively, the element may be placed into the ground, for example, by insertion by pushing hollow tube-like members or composite strips that contain the element into the ground. The element may be adhered to the interior of the tubular member or contained in the member as a strip, wrapped spiral, oval, cylinder, triangle, or the like. The tubular member preferably may have sidewall openings to permit water ingress and egress. The tubular member may comprise a rigid material such as metal, plastic, wood, etc. However, a pouch-like fabric container made from, for example, burlap is also suitable for some applications. The tubular member may be of any desired shape and may include, for example, a half circle or angular member. Such arrangement serves to locate and secure the element at a desired underground location. Once placed and secured underground, the element functions to collect, store, and ultimately dispense water for soil irrigation. Those skilled in the art will understand that such system may collect and store rainwater and/or artificially applied water and then dispense such water at a later time for watering purposes as the watered soil dries. Securing the placed element at a desired underground location may be accomplished by affixing or securing the element to a stable element so that the placed element remains at the desired location and does not move to a less desired and less effective location.

As may be appreciated by those skilled in the art, the above-mentioned first underground watering method embodiment functions by receiving water from the outside of the container. Such received water is absorbed by the SAP particles and then passes into the interior of the container through the adhered and affixed SAP particles where the water is collected and stored. Then the stored and collected water may be subsequently passed back to the outside of the device and into the soil as the water content of the soil may dictate as the soil becomes drier. FIG. 1 is an illustration of a vertical cross section taken along a longitudinal axis of a product of the invention useful in practicing this first method.

Figure 2:
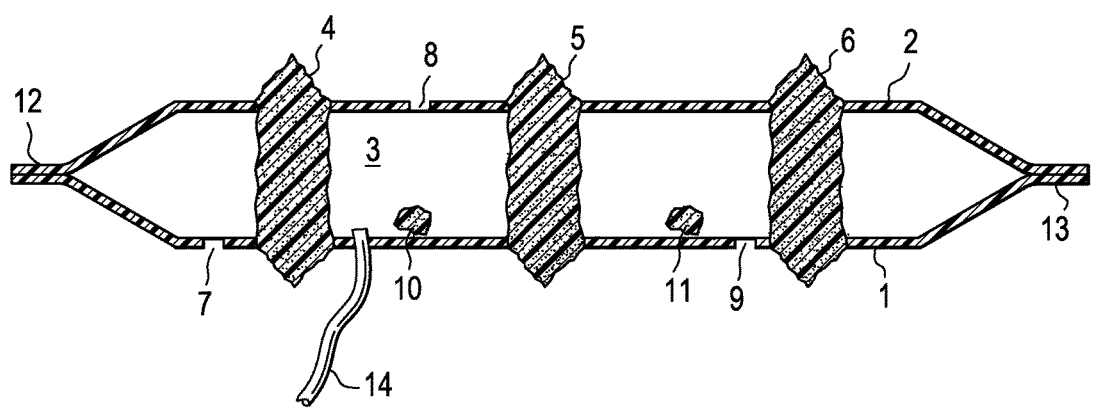
FIG. 2 is an illustration of a vertical cross section taken along a longitudinal axis of a watering element product of the invention shown in combination with a water intake element.

In contrast to the above first method, the second method introduces water to the area between the first and second films where the water is collected by the SAP particles and then dispensed into the soil. FIG. 2 is an illustration of a vertical cross section taken along a longitudinal axis of a product of the invention shown in combination with a water intake element. This product is useful in practicing the second method.

The second underground watering method embodiment can be broadly summarized as providing a hollow element having an interior opening, holes through its surface, and associated with a container having particles of SAP. The container may be clad upon the exterior surface of the hollow element or inserted and located within the hollow element. Locating the container inside of the hollow element is advantageous in that removal of an old container and replacement thereof is facilitated when the container is so located or associated with the hollow element. The container may be attached or affixed to the interior of the hollow element if desired to ensure positioning is maintained and the SAP particles have access to the sol through the openings in the hollow element. Attachment may be accomplished by spot adhesion or by mechanical means. The element is sealed at one end and connected to a source of liquid, such as water, at the other end. Another embodiment of the second underground watering embodiment comprises a composite watering element which is described in detail at a later portion of the present application.

As will become more apparent later, the first underground watering embodiment may be described as a passive system or method and the second underground watering embodiment as an active system or method. This distinction is made because the first embodiment, once located underground, functions by itself by collecting, storing, and dispensing water. On the other hand, the second embodiment requires an independent source of water input to function in its intended manner.

The container mentioned in the preceding paragraph is comprised of two films joined together and having SAP particles that have penetrated through both films and are secured to such films. The hollow element is connected to a water source. The process requires introducing water, optionally containing nutrients, into the interior of the hollow element, passing water through openings in the element where such water is absorbed by SAP particles in the container and then expelled or dispensed into the soil. However, a different watering unit container may be used such as those discussed later in the specification.

This above method of underground watering collecting, storing, and dispensing water into soil is conducted by placing a container underground in soil. The container is formed by joining a first and second film and is partially filled with particles of SAP which are broken through the outer surfaces of both films. The container is clad upon the exterior surface of a hollow element having openings extending from an interior surface to an exterior surface of such element. The element is connected to a source of liquid, such as water. The SAP particles held inside the container are free to expand in the container when in contact with the liquid due to free volume created by partially filling the container. As noted above, the container comprises a first film joined with a second film. The films may be made from plastic. The first film has an adhesive coated first side surface located on an inside surface of the container and an opposed second side surface located on an outside surface of the container. The second film has a first side surface located on an inside surface of the container and an opposed second side surface located on an outside surface of the container. Both the first and second films are sufficiently brittle for said particles of SAP to penetrate and break through the first and second films. The SAP particles are of a sufficiently large size to penetrate and break through the first and second side surfaces of the first and second films and to extend through the first and second side surfaces of said first and second films through openings created by penetration and breaking through the first and second films by such particles thereby creating further free volume for said particles to expand into thereby enhancing liquid absorption rate and creating further free volume for the broken-through particles to expand into when in contact with the liquid. These broken-through particles are spaced apart from each other to minimize touching of such broken through particles. A liquid, such as water or water containing plant nutrients or other ingredients, including for example pesticides, weed killers, and the like, is introduced from an liquid source into the interior of the hollow element to cause such liquid to enter the interior and pass through openings in the sides of the element and then contact the SAP particles in the container to collect and store such introduced liquid Then later, the collected and stored liquid is dispensed into the soil as the soil dries and additional liquid is required to compensate for water loss during drying of the soil.

Figure 9:
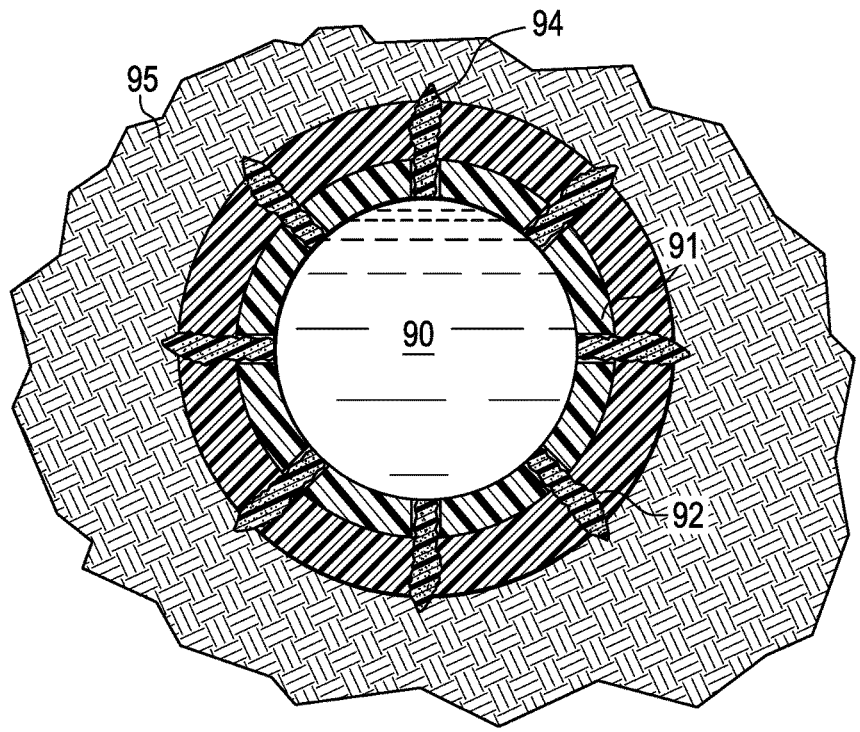
FIG. 9 is an illustration of a vertical cross section of a watering unit utilizing a hollow element having a sheath clad on its exterior surface.

FIG. 9 is an illustration of a vertical cross section of the above described watering unit. Watering unit 90 comprises hollow element 91 clad with sheath 92 which comprises the unit more specifically described in FIG. 2. SAP particles 94 serve to dispense water contained in hollow element 91 into soil 95.

More specifically, such second underground watering system involves a liquid containing water, that is collected externally of a dispensing unit, introduced into the dispensing unit, and then dispensed into soil, and ultimately to plant roots. The collected water may be provided by collecting rainfall, from a well, from commercial sources, or combinations thereof. Collected water may be fed by gravity, pressure, or a combination thereof via a pipe or tube into the watering unit. The watering unit comprises a rigid tubular member having an open end and a closed end. The tubular member may be composed of plastic, metal, wood, or combinations thereof. The tubular member is clad with a SAP particle containing sheath. The sheath comprises a container having a first film joined with a second film, the first film has an adhesive coated first side surface located on an inside surface of the container and an opposed second side surface located on an outside surface of the container and the second film has a first side surface located on an inside surface of the container and an opposed second side surface located on an outside surface of the container, the first and second films are sufficiently brittle for SAP particles to penetrate and break through the first and second films, the SAP particles are sufficiently large to penetrate and break through both first and second side surfaces of the first and second films whereby the SAP particles and extend through both first and second films through openings created by penetration and breaking through the first and second films by the SAP particles. Water enters the interior of the tubular member and then exits through openings located on the exterior walls of the tubular member whereupon water becomes absorbed and stored by the SAP particles in the sheath. The SAP particles extend beyond the sheath into the soil so that water may be dispensed into the soil. The dispensing rate is a function of the water content of the soil. Once in soil, the SAP particles attract and provide water to plant roots. As the process proceeds, watering becomes more efficient the closer the roots approach the SAP particles. An optimum or preferred water dispensing rate and usage may be determined by simple trial and error.

Figure 3:
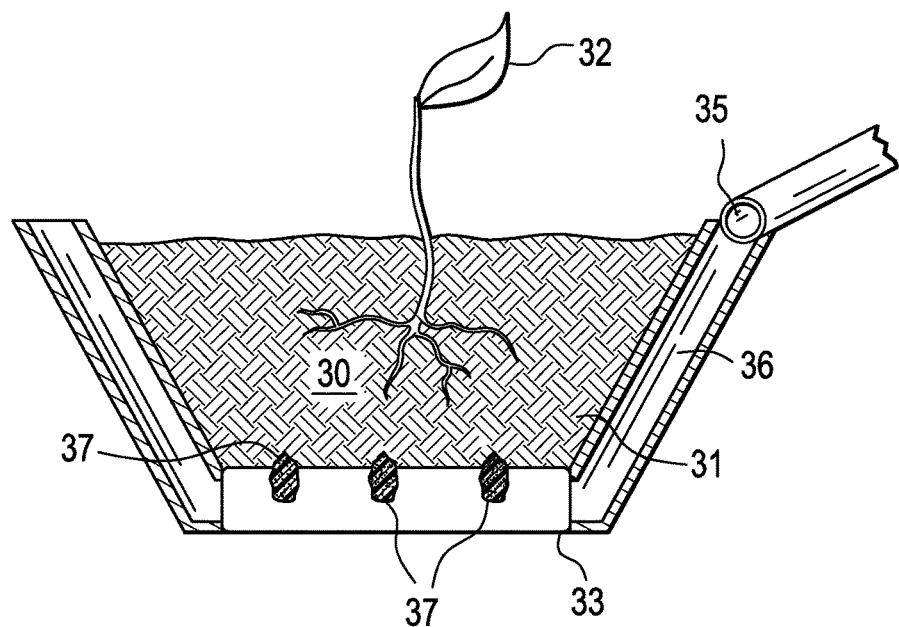
FIG. 3 is an illustration of a vertical cross section taken along a longitudinal axis of a vessel for holding plants in which water is introduced into the interior of a watering pad or propagation mat.
Figure 4:
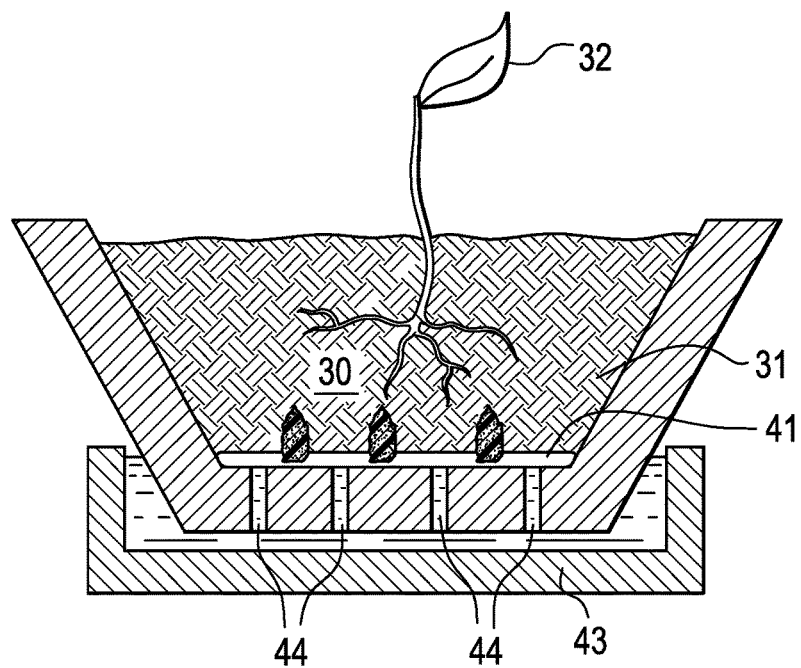
FIG. 4 is an illustration of a vertical cross section taken along a longitudinal axis of a vessel for holding plants shown in combination with a watering pad or propagation mat in which water is introduced externally into such pad or mat.

The product depicted in FIG. 2, 3, or 4 may also be used as a propagation mat in propagation systems for seeds. As shown in these figures, water is introduced in the manner illustrated by such figures into a location where the SAP particles are contacted. Then the particles collect, store, and dispense water into soil trays or vessels containing plant seeds where such seeds become propagated.

The above watering method may also be practiced with a different watering unit. Rather than using a clad hollow tubular member having openings located on the exterior walls, an incomplete tubular member in the form of an open rigid plastic half circle or angular member with the SAP containing sheath serving to close the open area of the half circle may be substituted. The incomplete member has an opening to permit water introduction on one end and is closed on the other end. In use, the bottom of the open half circle may be placed on a groove in the soil and the watering unit covered with soil. Water may then be introduced into the incomplete member. The water becomes absorbed and collected by the SAP particles and then dispersed into the soil to perform plant watering. Structural elements may be used with the unit to counter the weight of the soil and provide free volume for the unit and the SAP particles as needed.

Figure 10:
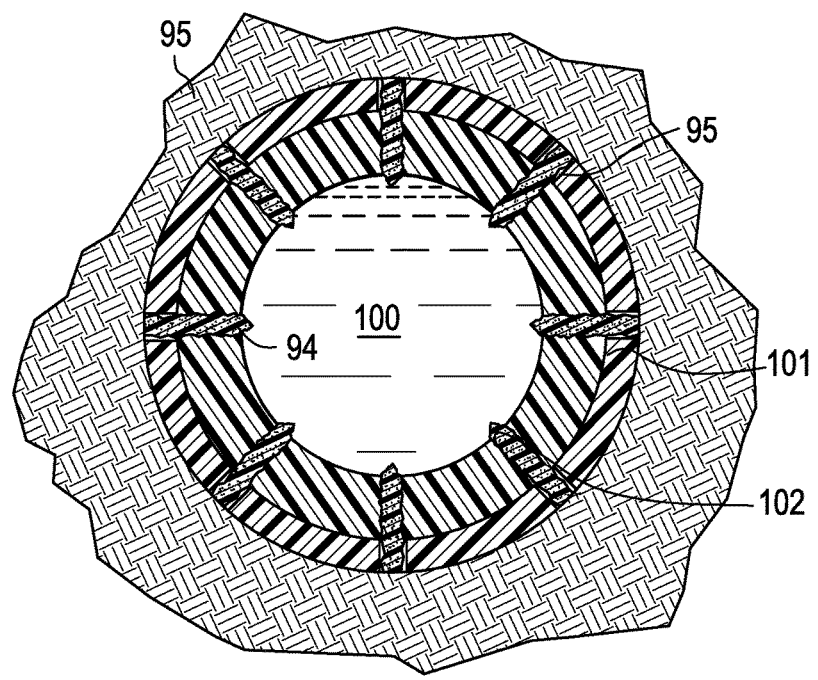
FIG. 10 is an illustration of a vertical cross section of a watering unit utilizing a hollow element having a sheath inserted into the inside of the hollow element.

The above watering method may yet also be practiced with a different watering unit. Rather than using a clad hollow tubular member having openings located on the exterior walls, the container may be inserted into the interior of the above-mentioned hollow member. The SAP particles may be contacted with water and such collected and stored water may be expelled from the tubular member through the open areas or holes in the tubular member and into the soil. The tubular member may be circular, square, rectangular, triangular, or any other geometrical shape. FIG. 10 is an illustration of a vertical cross section of the above described watering unit using a circular cross section. Watering unit 100 comprises hollow element 101 clad on its exterior with sheath 102 which comprises the unit more specifically described in FIG. 2. As also shown in FIG. 9, SAP particles 94 serve to dispense water from the hollow interior of watering unit 100 into soil 95.

As will be understood, the second general underground watering method embodiment of the present invention functions with use of a different concept, i.e., water or a water-containing liquid is introduced into the interior of a hollow element having openings in the wall from the interior of the element to the exterior where the introduced water passes through the openings, contacts the clad container, and becomes absorbed by the affixed SAP particles of the container. Such introduced water may be rainwater, artificial water, such as pressurized water from a utility or a well. The clad hollow element is placed at an underground or any other desired location and connected to a water source whereby water is admitted to and fills, to a desired level, the open area in the interior of the device. Water may be provided continuously or intermittently. This arrangement would conserve water by providing water only when needed, minimize overwatering, avoid harmful surface pooling, and salinity buildup in the soil. When irrigating soil with above ground applied water, the thus applied water floods and sinks into the ground. Over a period of time, salt from that contained in the water, builds up in the soil. Hence, the underground watering inventions of the present application involve reduce salinity build-up and evaporation losses.

Water may be provided to the various watering elements or units by using collected rainwater, well water, artificial, pressurized water from a commercial source, or combinations thereof. The absorbed water is subsequently passed into the soil through the SAP particles which contact and absorb the water. Following such absorption, water then is expelled from the SAP particles at the outside of the device into the soil to provide watering. The SAP particles collect and store water and then pass such water into the soil where watering would occur due to the lower water content of the soil.

The rate of water passage through the SAP particles depends somewhat upon the water content of the ground and the presence of plant roots that have become attracted to the SAP particles. Conceivably, water would be provided on an "as needed" basis. Thus, instead of collecting water into the product of the prior application via SAP particles, water is dispensed in the other direction, i.e., from the interior of the new product. Thus the respective inventive concepts are different As noted above, the first method and product embodiment comprises two films, with at least one film coated with an adhesive and SAP particles interposed between the films. The films are joined together by pressure with a resultant product having joined films with SAP particles having penetrated through at least one, but optionally both films, and held in place or secured in the opening in the film created by the SAP particle penetration and break through. In the second method and product embodiment, the SAP particles are required to extend through both films to function to collect and expel water. A third method and product embodiment utilizes SAP particle breakthrough on only one side of the two joined films. Such third embodiment is suitable for plant ball wraps where the SAP particles are directed toward the interior of the plant ball. All three require an opening and connection to permit the introduction of liquid between the films for subsequent dispensing into the soil.

It should be appreciated that the SAP particles in the container may be arranged to only dispense water in a desired direction or location so as to conserve the amount of water and SAP particles. For example, when watering plants or directing root growth, SAP particles may be arranged to extend from the container into the soil in a direction toward the plant root system.

Only certain surface areas of the watering element device, such as those exposed in the direction of where watering is desired, need contain SAP particles. For example, if corn were to be planted above a buried hollow element and clad container, only the top half surface of the hollow element and clad container Also the regions of SAP particles could be spaced apart from each other to conserve water by preferentially directing it toward desired areas in the soil. Of course, such directional placement of SAP particles would be suitable for other applications of the product, including plant root ball wraps. For example, locating SAP particles only on the side of the plant ball wrap facing the soil ball would result in directing water to the desired area while the non-SAP containing other side would not permit loss of water on such side. The SAP type, particle size, spacing, and location may be determined by trial and error as different soils, degrees of soil water content, types and needs of plants, type and composition of the wrap, projected frequency of water filling of the watering element device, and water capacity of such device all contribute to the desired watering requirements of the plant. However, it is pointed out that the above-mentioned unidirectional or one-way exposure of SAP particles is not essential because plant roots migrate to the source of water and thus would be attracted to and migrate to SAP particles wherever located.

Cladding may be performed by simply wrapping one or more SAP containing films around the hollow element and joining the films together in any convenient manner such as using an adhesive, pressing together each end, heat bonding, sealing, etc. One or more of the same or different wraps could be employed for cladding the structural member. The structural member should be rigid so as to provide structural integrity for prolonged use. Suitable materials include plastic, metal, wood, etc. A mesh, braided or woven plastic or metal material can be used as the structural member. Of course, reinforcement members could be used for structural members not having sufficient rigidity. The clad, watering element device is preferably closed at one end and the other end connected to a water source in a sealed manner. The cladding element may be either loosely arranged around the hollow structural element rather than being secured. Cladding may also be accomplished by the use of fasteners, adhesives or the like.

There may be an open area between the hollow element and the clad container. The size of such created area created is a function of the respective sizes of the products. Alternatively the film could be adhered or otherwise secured to the structural member. If desired, support elements could be used to maintain the shape of the opening, perhaps at one or both ends and mid-locations.

As set forth above, the invention also includes an underground composite watering element product for collecting, storing, and dispensing water-containing liquids into soil. The composite product comprises at least two containers that are a first film joined with a second film, the first film has an adhesive coated first side surface located on an inside surface of each container and an opposed second side surface located on an outside surface of each container and a second film having a first side surface located on an inside surface of each container and an opposed second side surface located on an outside surface of each container, the first film being sufficiently brittle for particles of SAP to penetrate and break through the first film. The first film has SAP particles of sufficiently large size to penetrate and break through the first and second side surfaces of the first film. The particles are adhered to and extend through the first and second side surfaces of the first film through an opening created by penetration and breaking through the first film by the particles thereby creating further free volume for the particles to expand into when in contact with the water-containing liquid. The broken through particles are spaced apart from each other to minimize touching of such particles thereby enhancing water absorption rate and creating further free volume for these broken through particles to expand into when in contact with said water-containing liquid. The SAP particles having been broken through the first film penetrate the thus created porous covering and extend into the soil. The containers have a water absorbent member interposed between the containers to form a composite product. The underground watering element is connected to a source of water-containing liquid.

The composite watering element has greater strength that a single container and thus is useful for applications where strength, including resistance to deformation, is desirable. In addition, the composite element obviously has the ability to collect and store greater quantities of water-containing liquids than a single container. These advantages are especially useful in processes such as erosion control, irrigation, as well as for athletic field and golf course watering grazing fields, and other agricultural uses. Depending upon a specific application, the element may be connected to a water source such as rainwater or pressurized water or simply absorb and collect water from the adjacent soil.

Figure 7:
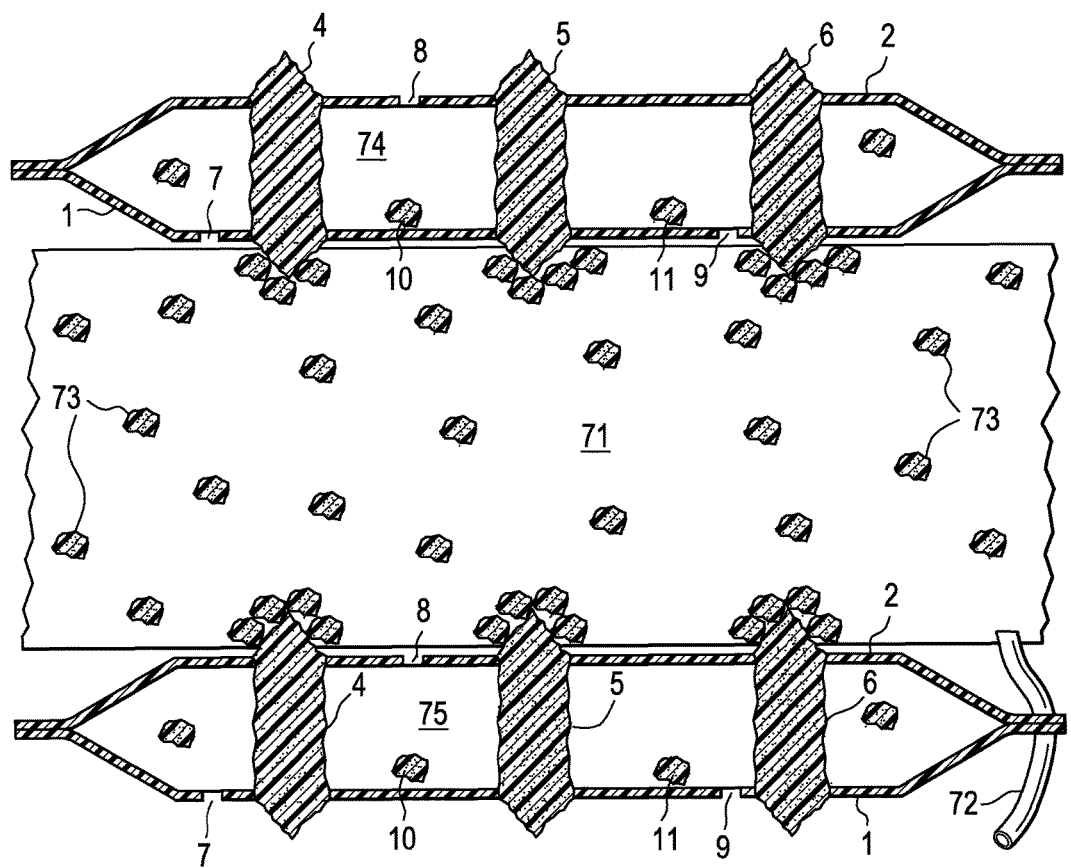
FIG. 7 is an illustration of a vertical cross section of an underground composite watering product.

A typical composite underground watering element is illustrated in FIG. 7 which is a vertical cross sectional illustration of such element. Water absorbing member 71 is a water absorbent core containing SAP particles 73 which are packed and sandwiched between elements 74 and 75. Of course other water absorbing materials such as felt, burlap, sponges, or the like may be substituted for SAP particles 73. It is also contemplated to embed or otherwise adhere SAP particles 73 within or on such water absorbing materials. All common elements in FIG. 7 are the same as described in FIG. 1. Element 72 is passageway to permit the entry or exit of water from water absorbing member 71. The use of a composite watering element adds structural strength to the device so as to minimize unwanted deformation in the soil and to preserve the function of the composite product. Suitable water absorbing materials include burlap, felt, and SAP materials such as starch containing SAP particles. In addition, structural support members can be utilized to improve structural integrity. Such members included honeycombed members, braces, fillers, and the like.

The above-mentioned new products, in addition to providing watering to plants in general, may be advantageously placed near plant roots for irrigation, placed to direct roots away from sewer pipes, placed to direct roots for seedlings, utilized to prevent or minimize soil erosion, especially on slopes, or for other water collecting and dispensing applications.

A method of watering a plant located in soil may utilize the above-mentioned composite watering element product This method embodiment comprises placing such composite product as an underground watering element in soil at a location below a plant and then providing a water-containing liquid to the watering element for collecting, storing, and dispensing the water-containing liquid to the soil to provide water to said plant. This method is advantageously employed for agricultural, especially for watering golf course greens.

Figure 8:
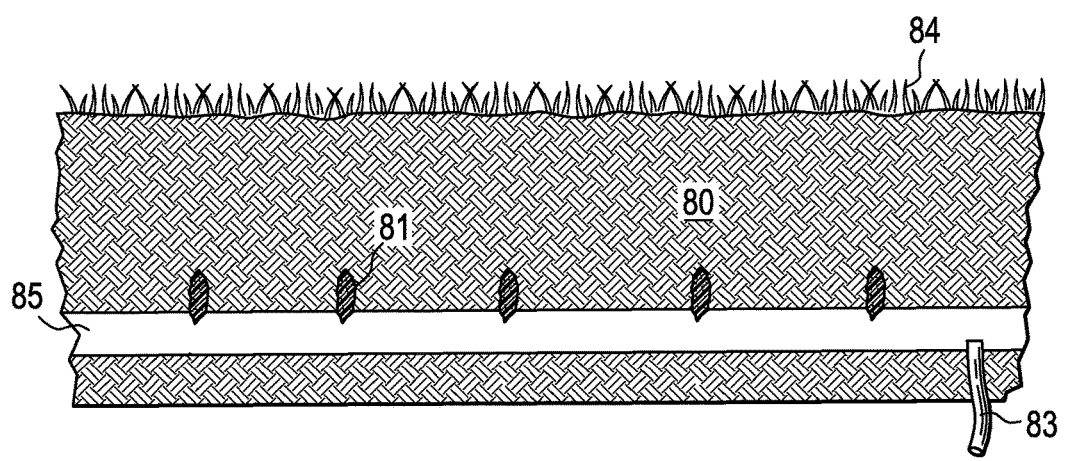
FIG. 8 is an illustration of a vertical cross section of a golf course green containing the composite product of FIG. 7.

The above watering method is depicted in FIG. 8 which is an illustration of a vertical cross section of a golf course green containing the composite underground watering product of FIG. 7. Golf course green 80 contains surface grass 84 and multiple underground layers that are not specified in FIG. 8. Composite underground watering element 85 has SAP particles 81 projecting into an adjacent layer of green 80 and constitutes one of such layers. Water is provided to underground watering element 85 through inlet 83.

Golf course green maintenance is often considered more of an art than a science. However, there are certain observations to be considered with regard to green watering practice. For example, wet greens provide poor playing conditions and can lead to infestations of weeds and algae. On the other hand, dry greens become hard and do not permit golf balls to hold. Thus a balance between wet and dry greens is desirable. It is believed that the underground watering technique of the present invention permits the attainment of such desirable balance. Top watering requires very close attention to attain such balance and varies from green to green and often involves overwatering. In addition, drainage of each green may vary. To address these problems frequent watering in small amounts becomes necessary. To ensure that top or above ground watering drains the surface adequately and reaches the grass roots, aeration is routinely employed. Holes created by aeration cause the green surface to become uneven and bumpy until grass re-grows over the holes. By watering underground, the problems associated with aeration may be avoided or minimized and the roots may be watered at a desirable depth, typically at about 2 to 10 inches in depth, depending upon the type of grass. In addition, potentially harmful green overwatering may be prevented. As may be seen, the present underground watering invention does not require above ground watering and thus avoids problems associated with above ground watering.

As known in the art, golf course greens are constructed with the use of multiple underground layers. In the instance of the present invention, an underground watering element or layer is placed at a depth of about 4 to 8 inches to ensure adequate root watering. Such arrangement is illustrated in FIG. 8. Golf course green 80 is comprised of grass 84 which is supported by multiple layers. Composite layer 85 is placed at a desired depth below grass 84, for example 2 to 10 inches. Layer 85 is in the form of a composite underground watering element such as illustrated in FIG. 7. However, the inclusion of a water absorbing material is optional. Water is introduced into element 85 through entry member 83 where the water becomes subsequently dispensed into the ground through the SAP particles and comes into contact with the grass roots. Other suitable watering elements described in the instant specification, such as that illustrated in FIG. 2, may be employed in place of that illustrated in FIG. 7. Obviously the optimum time to place the underground watering element is when a given athletic field or golf course green is constructed. However, existing athletic fields and greens may be modified by underground evacuations which are then filled with the element.

When the product of the present invention are used as elements to control or minimize soil erosion, the element may be placed underground with use of any of the above-described irrigation elements and/or placement techniques. Especially when relatively fine SAP particles are used in the erosion control element, water that would otherwise cause soil erosion is rapidly collected, stored, and later dispensed when the soil becomes drier. It is important to appropriately locate and secure the erosion control element because erosion is a repetitive event. The erosion control element may be secured in the manner mentioned above in connection with the irrigation element or may be secured to a stable underground element such as a rod, screen, stake, pole, hollow cylinder, cage, etc. or any other stable element.

The method of erosion control generally comprises placing an erosion control element beneath the soil and permitting the element to collect and store water thereby preventing water from causing erosion of the soil. The erosion control element comprises the composite underground element of FIG. 7 and is not connected to a source of a water-containing liquid. However such element may be connected to an exit element wherein collected and stored liquid containing water may be collected and withdrawn from said underground watering element rather than being permitted to be reabsorbed into the soil.

As mentioned above, another method of erosion control involves placing an erosion control blanket on ground where erosion is desired to be reduced. The blanket comprises a watering element and a seeding mat disposed above such element. This method comprises placing the blanket on the ground whereby watering element of the blanket collects, stores, and dispenses water to the seeding mat to assist the seeds to mature into a plant, such as grass or shrubs, and then to assist further health of the plants. The growth and subsequent health of the plant serves to reduce undesirable erosion of the ground.

The composite watering element of FIG. 7, in mat form, constitutes a suitable watering element for a portion of the erosion control blanket, although the water dispensing elements of FIGS. 1 and 2 could also be utilized. Seeding mats are known in the art and any type could be utilized in this embodiment. A typical seeding mat that is suitable for use in the present invention is commercially available from American Excelsior Company, Arlington Tex. This mat is sold for erosion control purposes and comprises a fibrous mat having seeds attached to fibers. It is also possible to form an erosion control blanket having multiple layers of the watering element and the seeding mat.

The products of the present invention may also be used for horticultural applications involving water collection, storage, and dispensing for trees or other plants contained within wrapped or unwrapped balls located in or above the ground. Such products may also be used in connection with plant root direction control processes. The elements and placement techniques described in connection with irrigation and erosion control elements are applicable for these applications as well.

The method of the present invention is used to make a product for absorbing liquids that is useful for, but not limited to, applications such as those described above. In such method, SAP particles are applied to and coat an adhesive coated side of a first sheet. Optionally, non-woven fabrics or woven fabrics having openings or other materials that may be absorbent or non-absorbent may be placed on the SAP particle coated surface of the first sheet prior to placement of the second sheet. Such materials may serve to further increase free volume for the SAP particles to expand into when coming in contact with a liquid. It is also contemplated that these materials may be placed on the adhesive coated surface prior to application of the SAP particles. In any event, the thus coated first sheet is then placed against or contacted with a second sheet to join the sheets and then pressure is applied to the joined sheets to further enhance joining (when the steps of placing and pressing are performed separately) and to cause the SAP particles to break through at least the surface of one of the sheets thereby creating free volume for the SAP particles to expand when in contact with a liquid. The steps of joining the sheets and breaking through the surface of at least one of the sheets with the SAP particles may be performed separately or concurrently.

Superabsorbent polymeric powders suitable for use in the present invention include, but are not limited to, a wide variety of anionic, cationic, and nonionic materials. Suitable polymers include polyacrylamides, polyvinyl alcohols, ethylene maleic anhydride copolymer, polyvinylethers, polyacrylic acids, polyvinylpyrrolidones, polyvinylmorpholines, polyamines, polyethyleneimines, polyquaternary ammoniums, natural based polysaccharide polymers such as carboxymethyl celluloses, carboxymethyl starches, hydroxypropyl celluloses, algins, alginates, carrageenans, acrylic grafted starches, acrylic grafted celluloses, chitin, chitosan, and synthetic polypeptides such as polyaspartic acid, polyglutamic acid, polyasparagins, polyglutamines, polylysines, and polyarginines, as well as the salts, copolymers, and mixtures of any of the foregoing polymers. Anionic polyacrylamide polymers are an example of a suitable material. These particles have sharp edges thereby facilitating the ability of the particles to break trough the surface of the sheet(s) during the pressing step of the present invention.

SAP particles, powders, films, or chips of starch-containing compositions are also suitable for use in the present invention despite the fact that such compositions are not generally strong enough to break through the top and bottom sheets of the product. When pressure is applied perpendicularly to the sheets, starch-containing SAP particles typically become crushed into a finer powder rather than breaking through at least one of the sheets. Despite such lack of strength, starch-containing SAP products may be used in combination with stronger particulate SAP products such as polyacrylates and polyacrylamides and non-SAP particles such as sand, rocks, metals, wood, and the like. Suitable starch-containing SAP products are sold under the trade name "Zeba" by ATI, Beaverton, Oreg. U.S. Pat. Nos. 3,425,791; 3,661,815; 3,981,100; 3,997,484; 4,134,853; and 4,194,998 are illustrative, but not limiting, of such starch-containing compositions. Many of such products are naturally occurring. The second and third of the patents listed above report water absorption up to 1000 times the weight of the composition. Such absorption capacity exceeds that of other typical SAP compositions such as polyacrylate and polyacrylamide compositions.

In the context of this invention, SAP particles having an average size from about 100 about 500 microns are typically used. The particle size is selected to be sufficiently large to penetrate and break the surface of one or both sheets when pressure is applied to the sheets and to maintain a sufficient distance or separation between the respective inner surfaces of the container pouch and thereby create and maintain sufficient free volume within the container to permit the needed expansion of SAP particles upon contact with a liquid.

With the above-enumerated SAP particle size considerations in mind, it is possible to further enhance the performance of the present invention by utilizing a mixture of fine and coarse SAP powders within the container. As mentioned above, the relatively coarse SAP particles having a size ranging from about 100 to 500 microns serve to maintain sufficient distance or separation between the respective inner surfaces of the container pouch to maintain sufficient free volume within the container to permit the needed expansion of the SAP upon contact with liquid. On the other hand, the additional presence of relatively fine SAP particles on the order of from about 20 to about 100 microns serves to enhance the speed of liquid absorption. Thus the mixture of coarse and fine SAP particles permits rapid liquid absorption but yet further creates and maintains the necessary free volume in the product to permit SAP powder expansion.

At least one sheet may be a plastic, such as polyvinyl chloride (PVC), or a copolymers of PVC and vinyl acetate or ethylene vinyl acetate provided that the sheets are sufficiently brittle to permit penetration and breaking by the SAP particles during the pressing step. In general, plastics containing plasticizers in amounts that impede breakage are not used for both sheets in the invention. Water-soluble plastic sheets are not typically used as the integrity of the container could be compromised. However, for short term applications or where container integrity is not necessary, water-soluble plastics could be used. Cellulosic sheets, such as paper, and metallic foils are also contemplated for some applications. The sheet or sheets intended to be broken typically have a thickness ranging from about 0.05 mils to about 0.5 mils. Provided that at least one of the sheets meets the requirements of the invention, the other sheet may be selected from materials that do not meet such requirements.

One or both of the sheets may be coated with an adhesive either prior to or applied, such as by spraying, during the process. Typically the first or lower sheet is coated with an adhesive although the SAP particles could be placed on a sheet having no adhesive and the a second sheet having an adhesive could be placed over and pressed against the first sheet to adhere the sheets and thereby form the container.

For example, U.S. Pat. Nos. 5,662,758; 5,871,607; and 6,194,062 disclose sheets or films having pressure sensitive coatings protected from inadvertent adherence. Sheets of this type, although certainly not essential to the practice of the present invention, would be advantageous to the practice of the invention from a sheet handling aspect if coils of sheet were to be used as a starting material. In any event, the sheets disclosed in the above-mentioned patents are suitable for use in the present invention for one or both of the sheets. Such suitability is because these sheets are sufficiently tacky to initially adhere the SAP particles to the first sheet and be sufficiently weak to permit the so-adhered particles to break through the surface of the sheet during the pressing step. It is contemplated that solid polymeric adhesives such as acrylic (poly isooctyl acrylate), styrenic (styrene copolymers), and elastomeric (urethane type) may be used in the present invention. Typical of these types of solid adhesives are Loctite's Contact Adhesive 30537 and Adchem's adhesive transfer tape Type 1666 (2 mils).

To maximize both the rapidness of liquid absorption and overall absorption properties of the product of the invention, it is necessary to provide for sufficient free volume surrounding the adhered SAP particles to permit expansion of such particles when making contact with a liquid. By spacing-apart individual particles during application to the adhesive coated surface of one of the sheets, free volume is created along the sides of the particles and sideways expansion facilitated. Should the particles be placed together or very close together, sideways expansion would be inhibited. The amount of free volume is further improved by causing SAP particles to break through the surfaces of both sheets thereby additionally permitting additional expansion of the particle in direction(s) perpendicular to sideways expansion when placed in contact with a liquid.

The process of the present invention may be used to cause openings or holes to be formed through either or both of the sheets by applying pressure to cause the SAP particles to break through the surface of the sheets. Should a product having such holes on only one sheet is desired, one of the sheets should be selected to be resistant to forming a hole when the pressure step is conducted. Such result may be achieved by using a sheet material that is resistant to breakage and/or is thicker than the particle and thus will not be fully penetrated upon pressing. Such "one-sided" product may be desired for use in applications leakage of absorbed liquid is undesirable, such as in a portion of a diaper core or a wipe. Of course, a "two-sided" product, i.e., one having holes formed on the surface of both sheets, is desirable for many applications when liquid absorption is desired to be maximized and when subsequent dispensing of the absorbed and collected liquid is desired.

It is advantageous to apply or place the SAP particles on the adhesive coated surface by sprinkling or otherwise arranging the particles in a manner whereby substantial touching of the applied particles is minimized Application of the SAP particles may be performed in one or more steps. Spacing the SAP particles apart serves to maximize free volume on a sideways direction for the particles. Simply sprinkling the particles on the adhesive coated surface of the sheet is an effective application technique as no particular pattern is required although it is desirable to uniformly coat the sheet with particles. The amount of particles place on the adhesive coated surface is dependent upon the desired amount of liquid absorption.

Conventional methods useful for applying SAP particles in the above-described spaced apart manner include curtain coating, spraying, electrostatic spraying such as by Corona discharge, roll coating, and other well-known techniques.

The first and second sheets may be joined by simply placing or contacting the sheets together thereby utilizing the adhesive to cause joining. It is contemplated using sheets having an adhesive coated on the surface of both sheets and then contacting both sheets at such adhesive coated surfaces. Such embodiment serves to enhance the joining step of the process and further enhances subsequent securing of the SAP particles following the pressing and break through step. Further enhancement of the joining of the respective sheets is obtained through the application of pressure to at least one of the sheets. The steps of placing and pressing may be conducted in sequence or concurrently Enhancing joining of the sheets and further sealing the container may be achieved by leaving a border on the sheet having the applied SAP particles and then pressing the two sheets together.

Pressure may conveniently be applied by passage of the sheets through a roll nip, rolling either or both surfaces of the joined sheets separately or at the same time, through application of pressure by a plate or the like. The process of the present invention may be practiced as a batch process or continuously. If practiced continuously it is preferred to pass webs of the respective sheets through a roll nip thereby combining the steps of joining the sheets and pressing the joined sheets. The rolls may be coated with a hard rubber surface or comprise wood, metal or any other suitable material The absorbent product of the invention may conveniently be formed by joining the edges, continuously or intermittently, of at least two sheets to form a pouch-like shape. Although openings may be created at appropriate locations on the surface following assembly of the container, it may be more convenient to create such openings prior to joining the films. Of course, if the embodiment involving forming holes by pressing a film against SAP particles is utilized, the aspect of preforming holes is not necessary, although an enhanced product could be made by using a sheet having precut or later formed holes and then forming further holes through the application of pressure against the SAP particles. Such enhancement would permit additional water contact with the sides of the SAP particles.

The absorbent product of the invention may optionally include openings at either or both of the sheet surfaces to permit liquid entry. Such openings may be sized to permit liquid entry. Typical opening configurations include, but are not limited to slits, holes of various shapes, meshes, etc.

It is contemplated that a pack or series of the absorbent product of the present invention may be used to increase the overall or total capacity to absorb liquids. Should the absorbed liquid be desired to be prevented from subsequently exiting from the pack, the outer surface of the pack can be formed from a liquid impervious material. The pack or a single element could have absorbent and shock reducing material, such as cotton fluff, absorbent woven and nonwoven fibers, etc, adjacent one or both sides of the container. Such arrangement would be suitable for diapers, wipes, feminine hygiene products and similar absorbent products.

When the absorbent product of the present invention is used as an absorbent core for products, such as a diaper, it is preferred to place the openings on only one surface of the container; i.e., the surface facing the infant. Of course the surface away from the infant would not have openings to prevent outflow of the liquid urine to undesired locations.

A product of the present invention and additional embodiments are illustrated by FIG. 1. This figure is an illustration of a vertical cross section of the product taken along a longitudinal axis. Sheets 1 and 2 are joined together at locations 12 and 13 to form absorbent product container 3 which contains SAP particles 4, 5, and 6 which extend through sheets 1 and 2 to create openings through which liquids may enter and exit container 3. Optionally, particles 4, 5, and 6 may be non-SAP particles. In another product embodiment, instead of creating openings with the use of particles, preformed hole openings 7, 8, and 9 are utilized to permit entry and exit of liquids to container 3. As illustrated, particles 4, 5, and 6, if comprising SAP particles, are free to expand upon contact with water or another liquid such as urine, at upper, lower, and side portions thereof because of the free volume created by spacing apart particles 4, 5, and 6. Moreover, additional SAP material 10 and 11 (in the form of particles or powder, films, sheets, chips, and the like) may be optionally placed in open areas between particles 4, 5, and 6. The additional SAP material should be of a smaller size than the height of particles 4, 5, and 6 so as to cause penetration and breakage of the sheets only by particles 4, 5, and 6. The additional SAP material may be the same or different composition than the larger SAP particles. Smaller SAP particles of the same type as the larger particles would have the advantage of more rapid liquid absorption rates. Incorporating a different, second SAP material having insufficient strength to penetrate sheets 1 and 2 with stronger particles 4, 5, and 6 permits the use of weaker, more highly liquid absorbent SAP products. Thus, the use of the aforementioned starch-containing SAP material is possible despite the weakness of such very high liquid absorbency products when in combination with stronger SAP particles. In addition, the rate of liquid absorption of starch-containing SAP materials may be enhanced by using large surface area materials, such as fine powders, chips, films, etc. In such combination of SAP materials, the larger, stronger particles serve to create openings in the absorbent container through which liquids, such as water or urine, enter the area between the sheets and become absorbed and stored by the SAP material having larger absorption and storage capacity.

Combinational products of the nature described in the preceding paragraph are beneficial for use as cores for absorbent products such as diapers and wipes because equivalent liquid absorbance and storage capacity would be obtained with use of less total SAP weight than if only the stronger SAP product were used. Clearly the use of the above-described combination of SAP products would also have exhibit advantages when used in irrigation, erosion control, plant watering, root direction control, and similar applications. For such applications, the ability of the starch-containing SAP product to collect and store very high amounts of water and nutrients, on the order of at least about 1000 to about 5000 times the weight of the SAP product is very desirable. In addition, starch-containing SAP products are known to be able to easily dispense water to plant roots. In the case of the above-described combinational product, water would pass into the interior of the container via the SAP particles that extend out, desirably through the surface of the top and bottom sheets, of the container and then pass into the starch-containing SAP product where such water would be collected and stored for subsequent dispersion to plant root systems. Dispensing, like collecting, would occur through passage through the extending SAP particles. Such system would have a larger storage capacity, and hence higher efficiency, than if only particles from the extending SAP product were used.

In making the product described in the preceding paragraph, the generally described process would be followed with the second SAP product either applied as a mixture with the larger first product or applied to the first sheet separately before or after application of the first SAP product. Separate application would permit more accurate spacing of the first SAP product and is thus preferred.

Three additional product embodiments are also included in the present invention.

The first embodiment comprises a pouch-like container formed by joining two sheets together. The use of an adhesive coating on one or both sheets and pressing the sheets together is a convenient mode of joining the sheets. Prior to joining the sheets superabsorbent material, including starch-containing SAP material in the form of a powder, a foil, a sheet, and like is placed against one of the sheets and thus will become contained following joining of the sheets. One or both of the sheets contain openings created by non-superabsorbent particles such as comprising sand, metals, ceramics, wood, rock, hard, and like strong, hard plastics, and other strong, hard materials capable of penetrating through one or more of the sheets and forming an opening upon pressing the sheets.

The second product embodiment is the same as the first embodiment except that preformed openings are utilized in at least one of the sheets rather that than non-SAP particles.

The third embodiment comprises a combination of the first and second embodiments and has openings in at least one of the sheets created by the non-SAP particles and also has preformed openings.

The above described three product embodiments are especially adapted for use in long term applications such as irrigation, erosion control, plant ball watering, and in plant root system root direction control techniques. Products for such applications may be in the form of elongated strips or tubes, circular or other shaped strips or tubes, or any other shapes compatible with the intended application. For example, for irrigation applications a long strip-like container may be conveniently placed underground during ground breaking occurring when plowing and seeding. For other applications, a hole or trench may be created, the product inserted therein, and the hole then covered.

The present invention also includes a vessel for holding a plant comprising a container capable of holding a plant wherein the container has a pad located at a bottom potion of the container and is connected to a source of a water-containing liquid The pad comprises a first film joined with a second film. The first film has an adhesive coated first side surface located on an inside surface of the container and an opposed second side surface located on an outside surface of said container. The second film has a first side surface located on an inside surface of the container and an opposed second side surface located on an outside surface of the container. Both the first and second films are sufficiently brittle for SAP particles to penetrate and break through both films. The SAP particles are of a sufficiently large size to penetrate and break through the first and second side surfaces of both films and thereby extend through the first and second side surfaces of both films through openings created by penetration and breaking through both first and second films by the SAP particles. The pad may also be constructed to obtain SAP particle breakthrough only one of the two films, depending upon the desired method of use of the pad. In any event, water is introduced into the pad from below the pad to cause the water to become absorbed and collected by the broken through SAP particles which extend into the soil and then dispense the stored water from the container to cause watering of plant roots contained in the soil.

The above vessel may also have the broken through SAP particles extend only into the soil. This embodiment requires that water be introduced into an interior portion of the pad because the side opposite to the broken through SAP particle has no such openings.

The product depicted in FIG. 2 may be used as a pad with a vessel for holding plants to collect, store, and dispense a liquid, such as water, into soil and to water a plant contained in such vessel. FIG. 2 is an illustration of a vertical cross section taken along a longitudinal axis of the pad product shown in combination with a water intake element. All common elements in FIG. 2 are the same as described in FIG. 1. In addition, opening 14 is utilized to permit the introduction of water into pad 3.

As illustrated in FIG. 3 vessel 30 is adapted to hold soil 31 and plant 32. FIG. 3 is an illustration of a vertical cross section taken along a longitudinal axis of a vessel for holding plants in which water is introduced into the interior of a watering pad or propagation mat. Pad 33 may comprise the bottom portion of vessel 30 and water 35 passed through an opening of tube member 36 and ultimately into pad 33. Water is collected, stored, and dispensed into soil 31 by SAP particles 37 contained in pad 33 whereby plant 32 is watered.

Rather than use pad 33 as the bottom of vessel 30, as illustrated in FIG. 3, it is also possible to use a vessel having a solid bottom and simply place pad 41 on the inside bottom of vessel 30. Such embodiment requires that water introduction be introduced into water holding tray 43 to permit the passage of water from tray 43 into pad 33 through holes or openings 44. Such product is illustrated in FIG. 4 which is an illustration of a vertical cross section taken along a longitudinal axis of a vessel for holding plants shown in combination with a watering pad or propagation mat in which water is introduced externally into such pad or mat. All common element numbers in FIG. 4 are as described in FIG. 3.

Figure 5:
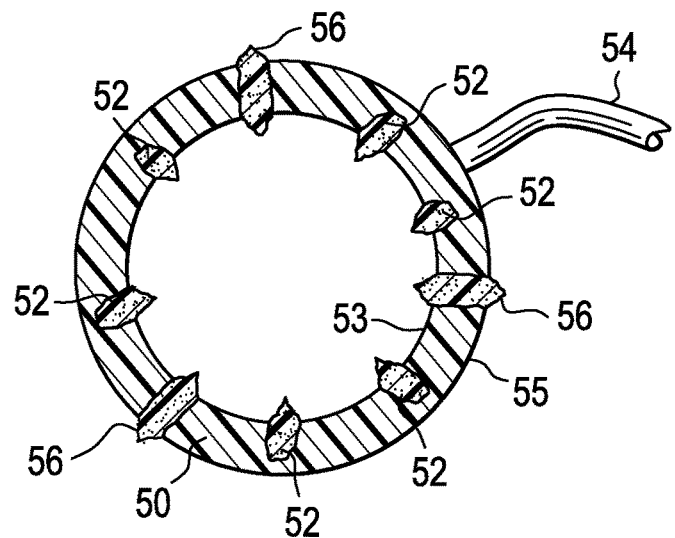
FIG. 5 is an illustration of a horizontal cross section of watering collar to be placed and secured upon a plant root ball, such as a tree root ball.

FIG. 5 is an illustration of a horizontal cross section of a watering collar to be placed and secured upon a plant root ball, such as a tree root ball. The plant has roots and is contained in a soil ball (not illustrated). The root ball is wrapped in a porous covering, such as burlap, and has a watering collar secured thereto at a desired location. The watering collar comprises a first film joined with a second film. The first film has an adhesive coated first side surface located on an inside surface of the water collar container and an opposed second side surface located on an outside surface of the container. The second film has a first side surface located on an inside surface of the container and an opposed second side surface located on an outside surface of the container. The first film is sufficiently brittle for the SAP particles to penetrate and break through the first film which has SAP particles of sufficiently large size to penetrate and break through the first and second side surfaces of the first film. These particles are adhered to and extend through the first and second side surfaces of the first film through openings created by penetration and breaking through the first film by the particles thereby creating further free volume for the particles to expand into when in contact with water. The broken-through particles are spaced apart from each other to minimize touching of the broken through particles thereby enhancing water absorption rate and creating further free volume for the broken through particles to expand into when in contact with water. The SAP particles do not break through the second film in the embodiment illustrated in FIG. 5 as such film is made from a less brittle plastic, such as that having an appreciable plasticizer content. In any event, the SAP particles having been broken through the first film then penetrate into the porous covering and extend into the soil. The watering collar has as an opening connection to a source of liquid whereby the water may be introduced into an open area in the water collar, collected and stored by the SAP particles, and dispensed into the soil of the plant root ball.

More specifically, water collar 50 is formed into a circular shape to be able to surround a plant root ball in the open area indicated by element 51. Water collar 50 may be placed upon and secured to a burlap tree ball wrap. Securing may be by fasteners such as clips, ties, straight rod elements placed below the collar which extend into the soil of the ball, adhesives, etc. It is contemplated that the collar may be a straight shape which is wrapped around the ball and then the ends joined to form a circular shape. The ends may be joined by tying, fastening with clips, clamps, Velcro or other types of adhesive fasteners, etc. Such arrangement permits custom fitting to a given plant root ball and also permits reuse of the collar. Collar 50 has SAP particles 52 broken through first film 53 and exposed to water that is introduced from inlet 54 into the space between first film 53 and second film 55. Fastening rods 56 serve to secure watering collar 50 to the plant root ball.

Figure 6:
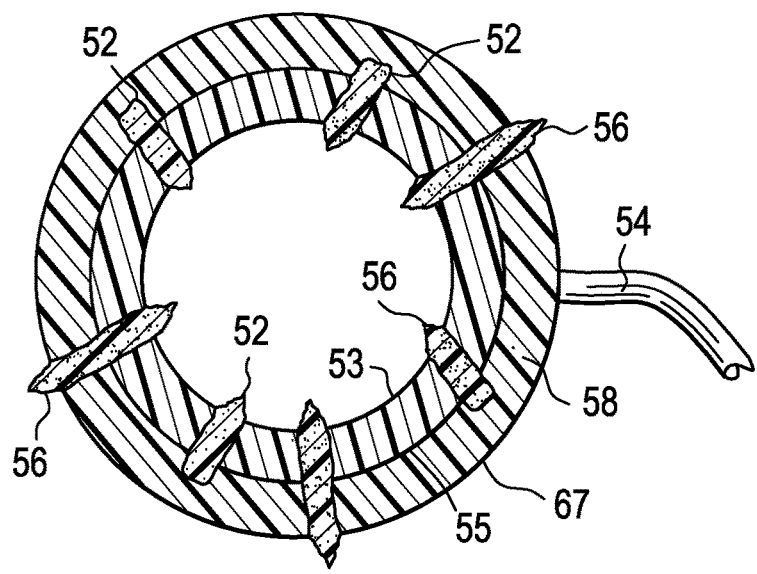
FIG. 6 is an illustration of another horizontal cross section watering collar embodiment to be placed and secured to a plant root ball.

A second water collar embodiment is illustrated in FIG. 6 which is an illustration of another horizontal cross section watering collar embodiment to be placed and secured to a plant root ball. All common element numbers in FIG. 6 are discussed in FIG. 5. In this embodiment, SAP particles 52 extend through both first films 53 and second film 55. Covering film 67 surrounds first film 53 and second film 55 and creates a space (not shown) between film 55 and covering film 67. Like FIG. 5, water is introduced from inlet 54. However, such water is collected in open space 58 where water is absorbed and collected by SAP particles 52 for dispensing into the soil of the plant root ball. Covering film 67 surrounds and is connected to first film 53 and second film 55 by attachment with fastening rods 56. Alternatively, films 53, 55, and 67 may be joined together, for example by an adhesive, at the ends and sides of the films. The amount of opening can be controlled by the relative sizes or dimensions of the films. For example, the larger film 67, the larger the opening between films 55 and 57. The same holds true for the size of the opening between films 53 and 55 in this embodiment illustrated in FIG. 6 and in the embodiments of FIGS. 1-5.

Once a plant root ball has been placed/transplanted into a pre-made opening created in the soil that is sized to receive the root ball, it may be desirable to provide water to the root ball. The transplanted root ball may or not be wrapped with burlap, may or may not have a watering collar of the type described in the present application. In any event, the watering method comprises placing a watering element containing SAP, such as that illustrated by FIGS. 2 and 7, into the underground opening suitable for holding a plant root ball, and then placing the root ball into the opening, and then providing a liquid containing water into the watering element where the provided liquid passes into the soil from SAP contained in the watering element whereby the roots of the plant are watered. The watering element may advantageously be in the form of a mat. The mat may be sized to fill the bottom of the opening or sized to be larger than the opening. When sized to be larger than the opening, the mat covers the bottom and sidewall, portions of the opening thereby providing enhanced watering capability.

The invention may be further understood by reference to the following Examples.

Example 1

SAP particles having an average size of about 300 microns are applied in a spaced apart pattern to a first PVC sheet having a solid adhesive coating to cause the particles to become adhered to the sheet. A second PVC sheet is then pressed against the coated first sheet with use of a metal plate to cause the sheets to become joined together and the adhered SAP particles to penetrate and break through the surfaces of both sheets. The resultant pouch-like container product is characterized as having good liquid absorption properties when placed in contact with a liquid.

Example 2

Example 1 is repeated except that the first sheet is made from polyethylene. The resultant product has SAP particles that are only break through the surface of the second PVC sheet. The resultant pouch-like container product is characterized as having good liquid absorption properties when placed in contact with a liquid.

Example 3

Example 1 is repeated except that a mixture of coarse and fine SAP particles is applied to the first sheet. The coarse particles have an average particle size of about 300 microns and the fine particles have an average particle size of about 40 microns. During the pressing step only the coarse particles penetrate and break through the surface of the two sheets. The resultant pouch-like container product is characterized as having good liquid absorption properties when placed in contact with a liquid.

Example 4

Example 1 is repeated except that a powder of starch containing SAP is also applied to the first sheet in addition to the SAP particles having an average particle size of about 300 microns. Upon pressing the sheets together only the SAP particles having an average particle size of about 300 microns break through the surface of both sheets. The resultant pouch-like container product is characterized as having good liquid absorption properties when placed in contact with a liquid.

Example 5

Example 4 is repeated except that non-SAP particles comprised of sand and having an average particle size of about 500 microns are substituted for the SAP particles and small openings or holes are provided through both sheets. The sheets are pressed and joined together and the sand particles break through the surfaces of both sheets. The resultant pouch-like container product is characterized as having satisfactory liquid properties when placed in contact with a liquid.

Example 6

A tree seedling is planted in the ground and permitted to grow to about three feet in height. The seedling and surrounding soil is then extracted in the form of a tree root ball. During extraction, a number of fine root ends of the tree become severed because such fine roots extended beyond the severed area. As a result of forming the tree root ball, the root system is damaged to the extent that the tree may become stunted or even die. The damaged tree root ball is wrapped in burlap and placed on the ground and stored at a nursery awaiting sale. A watering collar, such as depicted in FIG. 6, is placed around the wrap at a location in the ball corresponding to the tree roots and then secured in place with by fastening both ends of the collar together with a clamp. Water is then introduced into the interior of the watering collar through an on-off connection to a hose, the hose removed, and the connection to the collar is closed. The water in the interior is absorbed, collected, and stored by the SAP particles and subsequently is dispensed, by SAP contained in the collar, into the soil of the tree root ball and the tree roots are watered. Once the water contained in the interior is exhausted or somewhat depleted, additional water is added by the same procedure. The amount of water dispensed into the soil varies with the water content of the soil, with more water being dispensed as the soil dries. The tree roots grow to a normal state following dispensing and stunting is minimized and death avoided. The tree ball is then transplanted into a desired location in the ground.

Example 7

Example 6 is repeated except that the tree root ball does not have a compromised root system. Again watering serves to preserve the health of the tree roots during storage while it awaits transplantation.

Example 8

The watering element illustrated in FIG. 2 is placed in an opening created beneath the soil and then is covered by soil. The watering element is connected to a source of water. The source is a rectangular plastic box with an open top located above ground. Corn plant seeds are placed in the covered soil and corn is grown from such seeds. Rain occurs and rainwater is collected in the box and is fed under the influence of gravity into the watering element where the water is collected and passes from SAP particles contained in the watering element into the soil and provides water to the roots of the corn. This watering procedure is repeated as rain occurs. Water from another source is added periodically during periods of light or no rainfall.

Example 9

Example 8 is repeated except that the watering element illustrated in FIG. 7 is used.

The invention claimed is:

1. A watering method for collecting, storing, and dispensing water to plant roots contained in soil comprising:

(a) providing a container having an interior partially filled with particles of superabsorbent polymeric powder, said container connected to a source of water containing liquid, said particles in said container free to create to expand in said container when in contact with said liquid, said container comprising a first film joined with a second film, said first film having an adhesive coated first side surface located on an inside surface of said container and an opposed second side surface located on an outside surface of said container and said second film having a first side surface located on an inside surface of said container and an opposed second side surface located on an outside surface of said container, said first and second films being sufficiently brittle for said particles of superabsorbent polymeric powder to penetrate and break through said first and second films, said particles of superabsorbent polymeric powder of sufficiently large size to penetrate and break through said first and second side surfaces of said first and second films, said particles extending through at least said first and second side surfaces of said first film through openings created by penetration and breaking through said first film by said particles thereby enhancing liquid absorption rate and creating free volume for said broken through particles to expand into when in contact with said liquid, said broken through particles spaced apart from each other to minimize touching of said broken through particles;

(b) passing said water containing liquid from said source of said liquid into said interior of said container and contacting said particles of superabsorbent polymeric powder in said container to collect and store said liquid; and (c) dispensing said collected and stored liquid from said superabsorbent polymeric polymer particles to said plant roots contained in said soil.

* * * * *